US 6,559,615 B2

(12) United States Patent
Sethi

(10) Patent No.: US 6,559,615 B2
(45) Date of Patent: May 6, 2003

(54) FAILURE RESISTANT ELECTRIC MOTOR MONITOR AND CONTROL SYSTEM

(75) Inventor: Lalit Sethi, Troy, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/827,681

(22) Filed: Apr. 6, 2001

(65) Prior Publication Data

US 2003/0034754 A1 Feb. 20, 2003

(51) Int. Cl.[7] .................... G05B 23/02; G05G 1/14
(52) U.S. Cl. .......................... 318/565; 74/512
(58) Field of Search ................... 318/560, 561, 318/563, 565, 293; 74/512, 513, 514

(56) References Cited

U.S. PATENT DOCUMENTS

| | | | |
|---|---|---|---|
| 5,129,713 A | 7/1992 | Matsuda | |
| 5,270,628 A * | 12/1993 | Noguchi et al. | 318/587 |
| 5,351,573 A | 10/1994 | Cicotte | |
| 5,588,720 A | 12/1996 | Mattern | |
| 5,723,958 A * | 3/1998 | Boll et al. | 318/432 |
| 5,771,752 A | 6/1998 | Cicotte | |
| 5,823,064 A | 10/1998 | Cicotte | |
| 5,941,612 A | 8/1999 | Carpenter | |
| 6,056,384 A * | 5/2000 | Sato et al. | 318/439 |
| 6,298,745 B1 * | 10/2001 | Rixon et al. | 74/512 |
| 6,316,897 B1 * | 11/2001 | Ewing | 318/551 |
| 6,352,007 B1 * | 3/2002 | Zhang et al. | 74/512 |

* cited by examiner

Primary Examiner—Bentsu Ro

(57) ABSTRACT

A motor control includes a driver, an inverter, and a controller. The inverter electrically couples an input of the driver, an input of the controller, and a plurality of outputs of the controller. The controller is configured to actuate the driver. The method actuates a motor through the driver and the inverter.

21 Claims, 4 Drawing Sheets

FAILURE RESISTANT ELECTRIC MOTOR MONITOR AND CONTROL SYSTEM

FIELD OF THE INVENTION

This invention relates to a system and a method for controlling an electric motor, and more particularly, to a system and a method that provide failure compensated motor control.

BACKGROUND OF THE INVENTION

Increasing motor vehicle capacity, speed, and weight have steadily increased the risk of injury to occupants and pedestrians. A number of systems have been designed to provide occupant protection in the event of an accident. Active restraints, such as seat-belts, harnesses, and door locks restrain occupants in a vehicle, which minimizes their risk of being thrown within or from a vehicle.

Passive restraints also minimize the risks of injury and also do not require occupant activation. Air bags, for example, provide passive crash protection for vehicle occupants in a vehicle that collides with another object. An air bag inflates when a sensor, such as an accelerometer, detects a front-end or a side-impact collision. The sensor transmits an electric signal to an igniter that triggers a chemical reaction. The reaction inflates a cushion using an inflation gas to absorb the impact of the occupants as they are thrown against the cushion. Ports or vents within the cushion release the gas as the cushion absorbs the energy of the impact.

To perform well, an air bag must deploy quickly and forcefully to prevent occupants from striking the hard surfaces of the vehicle. The deployment force of the gas is greatest when the cushion is within two to three inches of an air bag cover. Optimally, occupants should be spaced from the undeployed air bag within a range of distances, but not closer than around 5 or 6 inches. Some occupants find it difficult to be positioned properly for comfort, visibility, and to access vehicle controls, and at the same time not be too close to the airbag. Recently, motor vehicle manufacturers have provided adjustable brake and accelerator pedals which are actuated by one or more electric motors. Since the proper operation of these actuators is important in providing the driver with access to critical vehicle controls, the systems must feature high reliability and tolerance to failures. Accordingly, there is a need for a failure resistant system for adjustable pedals that allows an operator to maintain a safe distance from the air bag cover. In addition, there are other vehicle systems utilizing electric motors in which failure resistance is a desirer feature.

BRIEF DESCRIPTION OF THE DRAWINGS

The dashed lines drawn in FIGS. 1 and 2 represent direct and indirect connections. As shown in FIGS. 1 and 2 other circuitry may be coupled between the controller, the motor driver, and the motor. Similarly, the dashed lines drawn in FIGS. 3 and 4 illustrate that other acts can occur before or after each illustrated act.

DETAILED DESCRIPTION OF THE PRESENTLY PREFERRED EMBODIMENTS

Embodiments of the system and the method of the present invention described below provide an improvement in monitoring and managing an electric motor controller, a driver, and a load. The system and the method use monitoring routines and switches to manage and compensate for physical and functional failures in the controller, the driver, the switches, and/or the load. The system and method may be interfaced to or be made unitary with any vehicle safety system, such as an adjustable pedal or an airbag system.

Figure 1:
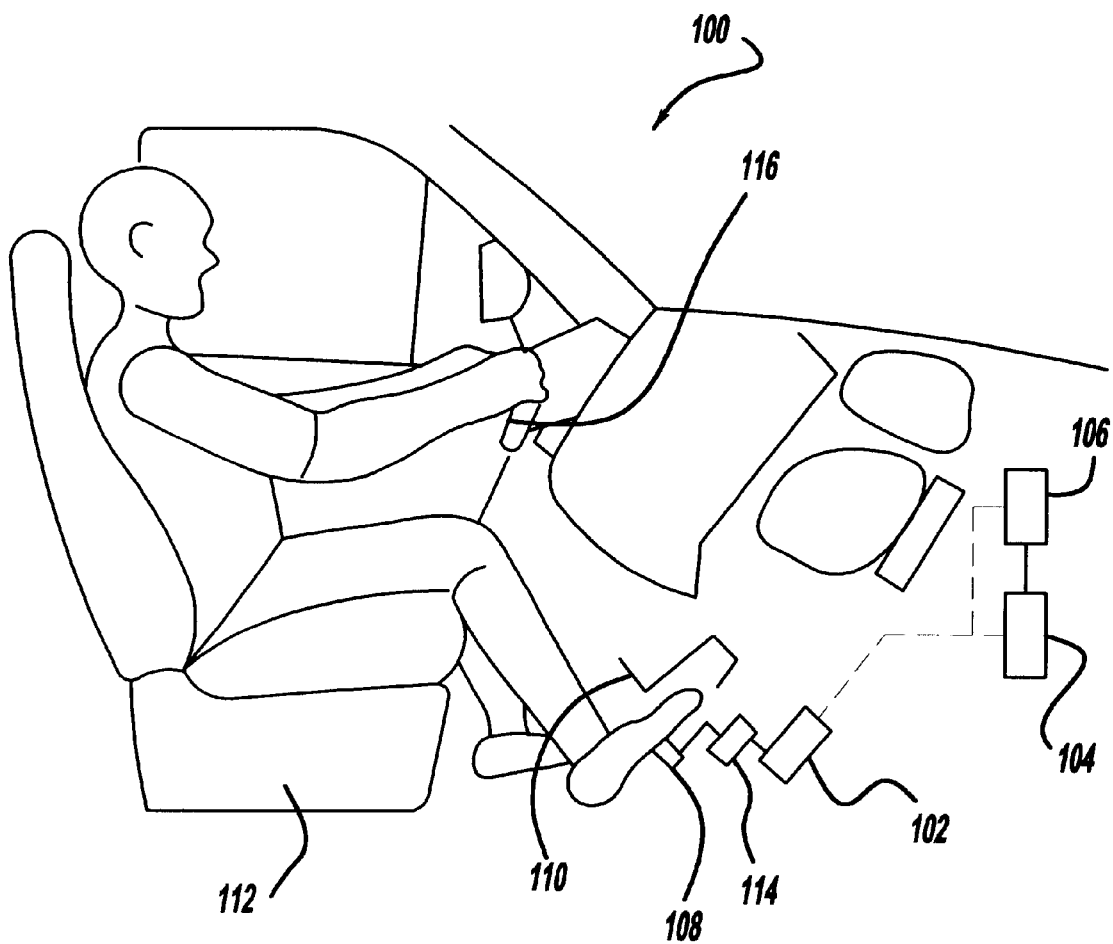
FIG. 1 is an illustration of a vehicle incorporating a preferred embodiment of the invention.

FIG. 1 is a partial block diagram of a vehicle 100 incorporating an embodiment of the invention. The vehicle 100 includes a motor 102, a motor driver 104, and a controller 106. The motor 102 is mounted behind an accelerator pedal 108 and/or a brake pedal 110 to control the position of the accelerator 108 and/or the brake pedal 110 relative to a seat 112. By rotating a shaft 114, the accelerator pedal 108 and/or the brake pedal 110 are adjusted toward or away from the seat 112 without changing the pedal(s) trajectory. These pedal adjustments improve operator comfort and allow the operator to maintain a safe distance from an air bag 116 or an air bag cover. In other embodiments, the pedal adjustments can be used to detect operator position relative to one or more vehicle restraints, which allow the restraints to be tailored to the operator's physical stature.

Referring to FIG. 1, the motor driver 104 is controlled by a control means or a controller 106. The control means preferably includes a programmed or a programmable micro-controller that delivers a sufficient current to a load. In this embodiment, the load is the motor 102. The controller 106 includes a software routine, a circuit, and/or a device that monitors and retains in memory the state of the controller 106, the motor driver 104, and/or the motor 102. The controller 106 also monitors the unregulated voltage generated by a power source 244 shown in FIG. 2. When the unregulated voltage falls below a low threshold or climbs above a high threshold, the controller 106 does not actuate the motor driver 104 because motor 102 operation outside the high and the low thresholds cannot be assured.

Figure 2:
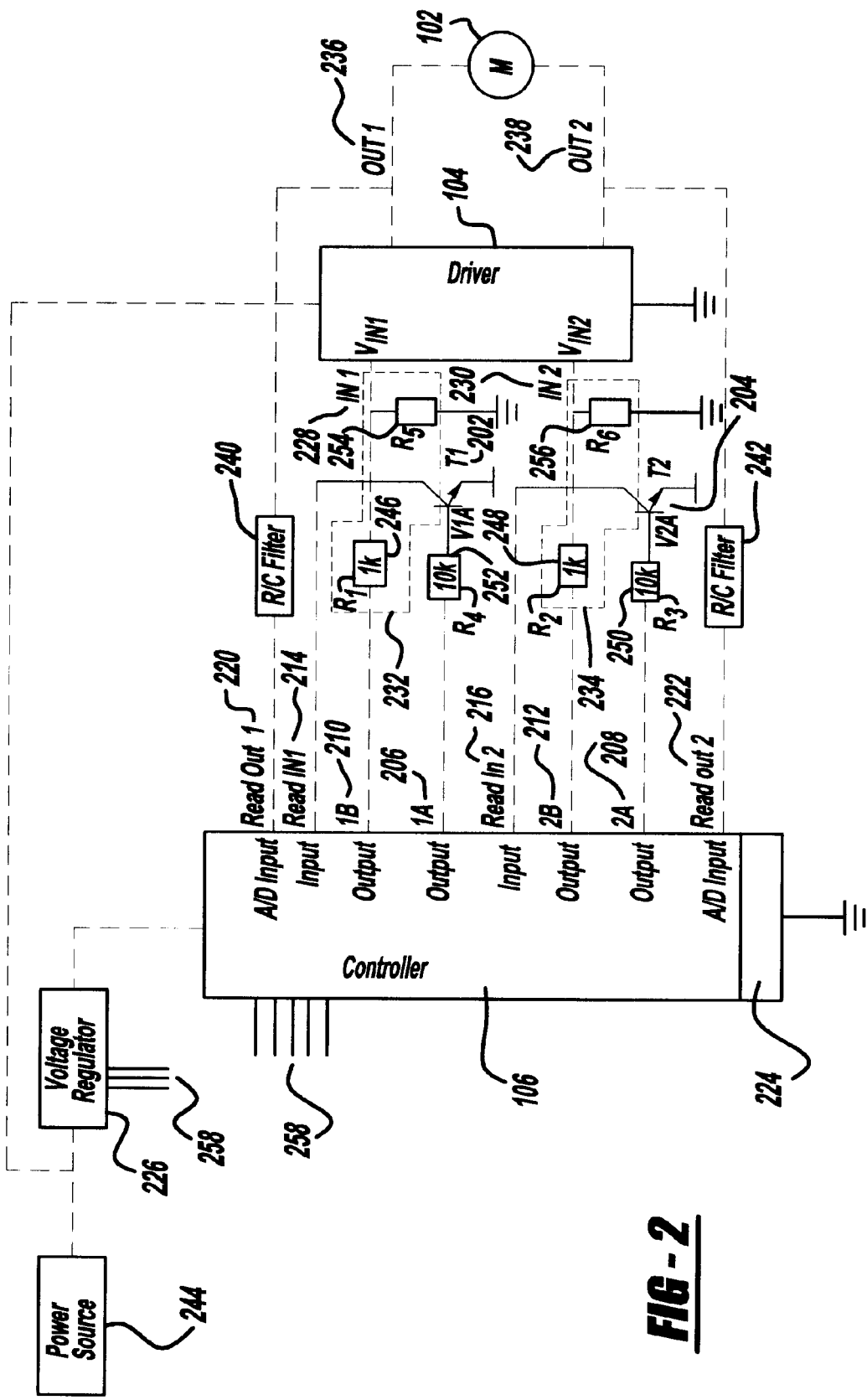
FIG. 2 is a schematic of the preferred embodiment of FIG. 1.

As shown in FIG. 2, the controller 106 interfaces the motor driver 104 and a pair of fault compensators or inverters 202 and 204. The inverters 202 and 204 intercede when a failure occurs. The inverters 202 and 204 are implemented in this embodiment using npn-type transistors having base and collector terminals biased by the controller 106. The transistors operate as voltage controlled switches controlled by input voltages $V_{XA}$. The "X" subscript in this reference refers to the illustrated output terminals of the controller 106. When $V_{XA}$ is low, the switch is open and the junction between the inverter and the driver input, $V_{INX}$, will be a divided voltage $V_{XB}$. In other words, $V_{INX}$ will be driven to a controller voltage divided by the resistors that interface the controller 106 to the motor driver 104. When $V_{XA}$ is high, the switch will be closed and $V_{INX}$ will be slightly greater than zero because the bipolar transistors have an offset voltage $V_{offsetX}$ and an internal resistance $R_{onx}$. In alternative embodiments, $V_{INX}$ will be equal to zero.

The operating modes of the controller 106 are implemented using software, but may be implemented using hardware or firmware. The controller 106 uses a plurality of output lines 206, 208, 210, and 212 to control the rotation of the shaft 114 illustrated in FIG. 1. In this embodiment, multiple input lines 214, 216, 220, and 222 interface the outputs 206, 208, 210, 212, 236, and 238 of the controller 106 and the motor driver 104. The controller 106 uses programmed inputs/outputs (I/Os) to track status and provide a quick recovery for device failures. From a logic perspective, the operating conditions of the controller 106, the inverters 202 and 204, the motor driver 104, and the motor 102 can be illustrated in a table describing the intended and the actual shaft rotation of the motor 102. Table 1 quantifies the operation of the controller 106, the inverters 202 and 204, the motor driver 104, and the shaft 114 in this embodiment.

TABLE 1

| Entry # | Output 1B | Output 2B | Output 1A | Output 2A | Input IN1 | Input IN2 | Out1 & Input A/D$_1$ | Out2 & Input A/D$_2$ | Nodes Where Failure(s) Were Detected | Intended Shaft Rotation | Actual Shaft Rotation |
|---|---|---|---|---|---|---|---|---|---|---|---|
| 1 | 0 | 0 | 0 | 1 | 0 | 0 | 0 | 0 | 1B | Forward | None |
| 2 | 0 | 1 | 0 | 1 | 0 | 0 | 0 | 0 | 1B, 2B | Forward | None |
| 3 | 1 | 0 | 0 | 1 | 1 | 0 | 1 | 0 | None | Forward | Forward |
| 4 | 1 | 1 | 0 | 1 | 1 | 0 | 1 | 0 | 2B | Forward | Forward |
| 5 | 0 | 0 | 1 | 0 | 0 | 0 | 0 | 0 | 2B | Reverse | None |
| 6 | 0 | 1 | 1 | 0 | 0 | 1 | 0 | 1 | None | Reverse | Reverse |
| 7 | 1 | 0 | 1 | 0 | 0 | 0 | 0 | 0 | 1B, 2B | Reverse | None |
| 8 | 1 | 1 | 1 | 0 | 0 | 1 | 0 | 1 | 1B | Reverse | Reverse |
| 9 | 0 | 0 | 1 | 1 | 0 | 0 | 0 | 0 | None | None | None |
| 10 | 0 | 1 | 1 | 1 | 0 | 0 | 0 | 0 | 2B | None | None |
| 11 | 1 | 0 | 1 | 1 | 0 | 0 | 0 | 0 | 1B | None | None |
| 12 | 1 | 1 | 1 | 1 | 0 | 0 | 0 | 0 | 1B, 2B | None | None |
| 13 | 0 | 1 | 1 | 0 | 0 | 1 | 1 | 1 | Out1 | None | None |
| 14 | 1 | 0 | 0 | 1 | 1 | 0 | 1 | 1 | Out2 | None | None |

As shown in Table 1, no failures occurred in entries 3, 6, and 9. Under these conditions, the "A" control lines 206 and 208 are the logical inversions of the "B" control lines 210 and 212, respectively. In other words, control line 1A 206 is the compliment of control line 1B 210 and control line 2A 208 is the compliment of control line 2B 212. However, the "A" control lines 206 and 208 are not always the logical inversions of the "B" control lines 210 and 212. In Table 1, the intended shaft rotation is attained in entries 4, 8, and 10–14 through selective control of the "A" control lines 206 and 208. Even though one or more failures occurred, the system and method overcome these failures to attain desired results. When selective control of the "A" control lines 206 and 208 did not attain desired results, as shown in entries 1, 2, 5, and 7 of Table 1, the system and method compensated for these failures by preventing shaft rotation.

It should be noted, that the controller 106 can code all of the failures described above into diagnostic codes. These diagnostic codes can be stored in a resident memory 224 or an interfaced memory such as a PROM or an EEPROM that can be copied from or read through a serial or a parallel interface.

To assemble this embodiment, the controller 106 is interfaced to the power source 244 through the voltage regulator 226, and is interfaced to the inverters 202 and 204, and the motor driver 104. The output nodes of the controller 106 interface the inverters 202 and 204 and the motor driver 104 through resistors R$_1$ 246, R$_2$ 248, R$_3$ 250, and R$_4$ 252, respectively. The "B" outputs, 1B 210 and 2B 212, interface the forward and reverse nodes, IN1 228 and IN2 230, of the driver 104 through current limiting and pull down resistors 232 comprised of R$_1$ 246 and R$_5$ 254 and current limiting and pull down resistors 234 comprised of R$_2$ 248 and R$_6$ 256, respectively. The illustrated values were selected to deliver a predictable fraction of the output voltage of the controller 106 to the inputs, IN1 228 and IN2 230, of the driver 104, although other resistive or linear or reactive components may also be used. The "A" outputs 1A 206 and 2A 208 bias the inverters 202 and 204 through resistors R$_3$ 250 and R$_4$ 252. The inverters 202 and 204 are selected to sink the current sourced by the "B" outputs 210 and 212.

The embodiment illustrated in FIG. 2 further monitors system and method operation. Two nodes, Read IN1 214 and Read IN2 216, interface the motor driver 104. These nodes, Read IN1 214 and Read IN2 216, are read by the controller 106 to monitor the logic states of the driver inputs IN1 228 and IN2 230. Two nodes, Read out1 220 and Read out2 222, interface the motor inputs, out1 236 and out2 238, through RC filters 240 and 242 that are preferably low-pass filters. Preferably, the controller 106 monitors the junction between the motor driver 104 and the motor 102, out1 236, and out2 238 by sampling the signals passing through pass-bands of the low-pass filters through an analog to digital conversion. Preferably, the low-pass filters attenuate the interference caused by inductive spikes, motor reflections, and/or other interference that prevent the detection of motor driver 104 and/or motor 102 failures.

Preferably, an H-bridge is used to implement the motor driver 104 in this embodiment. The H-bridge provides precise shaft 114 control and a braking characteristic that stops the shaft 114 from rotating freely when not moving under the direction of the controller 106. The braking characteristic of the H-bridge occurs when the coil(s) (i.e., the stator coils) of the motor 102 short. Shorting causes the voltage produced by the rotation of the shaft 114 to fold back into the coil(s) which retards shaft 114 rotation. The faster the shaft 114 attempts to turn, the more the braking characteristic inhibits shaft 114 rotation. In this embodiment, a pulse width modulated control intelligent H-bridge is used, although any other H-bridge may be used in alternative embodiments. Preferably, the H-bridge provides protection against over-voltage, over-current, over-temperature, and/or cross conduction faults while providing forward, reverse, and brake modes of operation.

A Direct Current (DC) motor is used to implement the motor 102 in this embodiment. Preferably, a servomechanism is also used, such as a position sensor that compares the rotation of the shaft 114 to a desired rotation and rotates the shaft 114 accordingly. As shown in FIG. 2, a DC motor can have two input nodes, out 1 236 and out2 238, interfaced to the motor driver 104. The motor 102 responds to the direction that current flows through the coils (i.e., the stator coils) to determine the direction of shaft 114 rotation. In other words, when current flows from out1 236 to out2 238, the motor shaft 114 rotates in the forward direction, and when current flows from out2 238 to out1 236 the motor shaft 114 rotates in the reverse direction. In alternative embodiments, a stepper motor is used. In these embodiments, the stepper motor produces a very high torque at a low speed without using gears. Preferably, the stepper motor has a holding torque that allows the stepper motor to hold the shaft's 114 position firmly when not energized by the motor driver 104. In these embodiments, there is no need for a braking mechanism to maintain the shaft's 114 position. Preferably, a translator interfaces the stepper motor. The translator converts direction signals, such as IN1 228 and IN2 230 in this embodiment, into a winding actuation pattern. In these embodiments, separate drivers interface each of the stepper motor coils.

As described, the system and method may interface or may be a unitary part of a vehicle safety system. When interfaced or made apart of an adjustable pedal or an air bag system, a vehicle controller or an Adjustable Pedal Module-Electronic Control Unit (APM-ECU) controls and monitors the motor driver 104 and the motor 102. In this embodiment, the adjustable pedal system is an interactive device that interfaces a system bus 258 such as a J1850 bus and provides the operator with the option of moving the accelerator 108 and/or brake pedal 110 toward or away from the seat 112 of the vehicle 100. In some embodiments, a remote keypad or a button coupled to the interior of the vehicle 100 interfaces the controller 106 and provides remote or local control of the accelerator 108 pedal and/or brake pedal 110 adjustments. When these embodiments are interfaced to a memory 224, preferred pedal adjustments are retained and a one-button reset capability can be added to the vehicle 100 to automatically adjust one or more of the pedals to programmed positions.

Figure 3:
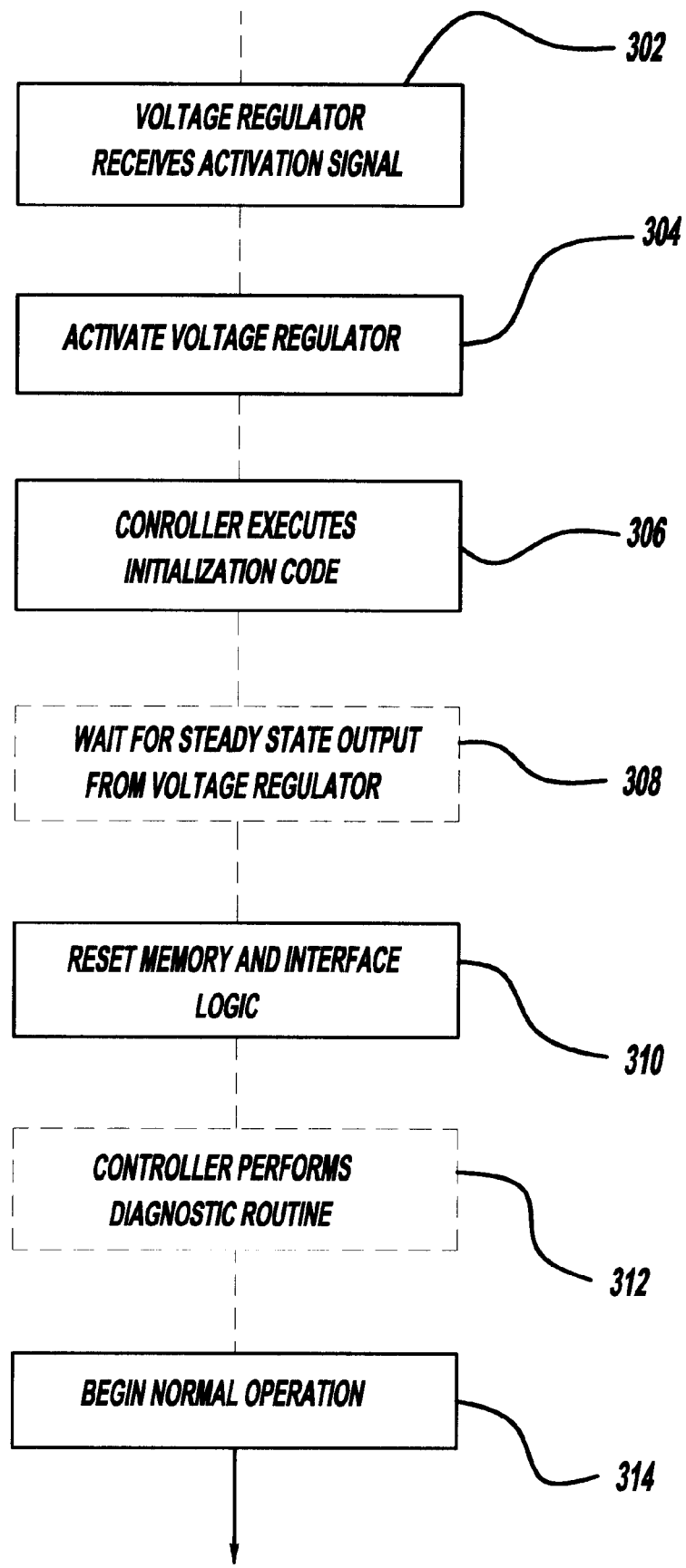
FIG. 3 is a flow diagram of the preferred embodiment of FIG. 1 awakening from a sleep mode.

FIG. 3 shows a flowchart of an embodiment of the invention awakening from a sleep mode. In this embodiment, sleep mode is a temporary state of suspension in which ancillary components such as the driver 104 and the motor 102 are shutdown to conserve power. At act 302, the voltage regulator 226 receives an analog or digital activation signal. The signal may be generated by a manual switch or an electronic device through the bus 258, such as the J1850 bus. At act 304, the voltage regulator 226 is awakened. At act 306, the controller 106 partially an initialization code. If the voltage regulator 226 was awakened by the manual switch, the controller 106 reads a digital value, preferably through an analog to digital converter. At act 308, a delay occurs to ensure the output voltage of the voltage regulator 226 reaches a preferred level, such as five volts. In this embodiment, a 0.5 millisecond programmed delay occurs. At act 310, the memory 224 and the interface logic of the controller 106 are reset. If the voltage regulator 226 is awakened through the bus 258, the controller 106 receives a message through the bus 258. At act 312, the controller 106 performs a diagnostic routine. Preferably, the diagnostic routine evaluates the controller 106, the inverters 202 and 204, and/or the motor driver 104. At act 314, normal operation begins.

Figure 4:
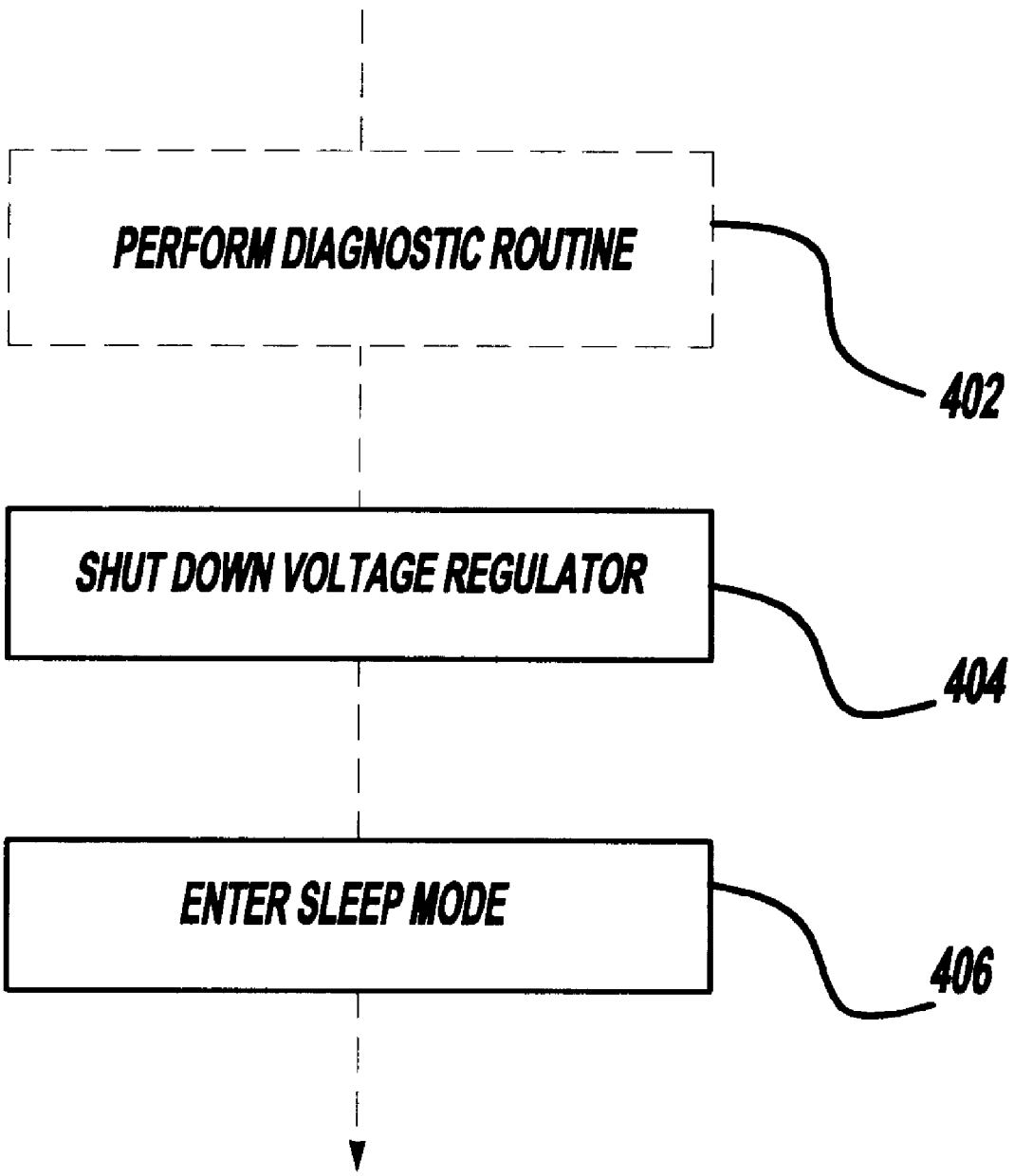
FIG. 4 is a flow diagram of the preferred embodiment of FIG. 1 entering sleep mode.

FIG. 4 shows a flowchart of an embodiment of the invention entering a sleep mode. At act 402, the controller 106 performs a diagnostic routine. Preferably, the diagnostic routine evaluates the controller 106, the inverters 202 and 204, and/or the motor driver 104. At act 404, the voltage regulator 226 shuts down. At act 406, the system and method enters a sleep mode. At this act, peripheral components are shutdown including the motor 102, the motor driver 104 and any oscillators.

The system and methods described above are not limited to particular circuit configurations, as the RC filters 240 and 242 may not be used in alternative embodiments. When RC filters are used, the RC filters can be implemented using analog or digital filters. In some alternative embodiments, clamping diodes electrically couple the input nodes of the motor to an electrical ground. The clamping diodes attenuate back electromotive force (back EMF). The use of separate power supplies or regulators for the controller 106 and the motor driver 104 in other alternative embodiments reduces the chance of voltage spikes or interference from reaching the controller 106 and/or the motor 102. Optical and/or electrical isolation may also be used in other alternative embodiments between the controller 106, the motor driver 104, and/or the motor 102 to protect the controller 106 and the motor driver 104 from the high voltage potentials that energize the motor 102.

Table 2 lists an exemplary parts list that may be used to assemble an exemplary embodiment of the invention. Of course, many other alternatives are possible. For example, the controller 106 may be implemented through software alone. The system and method also may be integrated within or made unitary to a stand-alone device that drives a motor, monitors controller and motor performance, and compensates for all failure conditions. The system and method may also be used in alternative vehicle applications such as power steering and power seat applications. Of course, the system and method is not limited to a vehicle application.

TABLE 2

| Component | Name or Value | Manufacture | Location |
|---|---|---|---|
| Controller | PMS 370X1601X* | Texas Instrument, USA | Houston, TX |
| Voltage Regulator | TLE4279GM | Siemens, USA | Auburn Hills, MI |
| Driver | TPIC108B | Texas Instrument, USA | Dallas, TX |
| Motor | Any | Any | Any |
| Resistor R1 | 1,000 Ω | Any | Any |
| Resistor R2 | 1,000 Ω | Any | Any |
| Resistor R3 | 10,000 Ω | Any | Any |
| Resistor R4 | 10,000 Ω | Any | Any |
| Resistor R5 | 100,000 Ω | Any | Any |
| Resistor R6 | 100,000 Ω | Any | Any |
| RC Filter(s) | R = 18,000 Ω | Any | Any |
| | C = 1 × 10$^{-9}$ F | Any | Any |

*"X" is an integer between one and nine.

The invention provides a sophisticated system and a method that monitors the states of the controller 106, the motor driver 104, and the motor 102 and further compensates for failure conditions. When a hardware or a software failure is detected, the system and the method attempt to overcome the failure. If the failure cannot be overcome, the system and the method prevent the motor 102 from being driven. The system and method further monitors the state of the controller 106, the motor driver 104, the inverters 202 and 204, and the motor 102 to detect physical failures such as latched states and functional failures such as a permanently enabled state, a permanently disabled state, etc.

The foregoing detailed description describes only a few of the many forms that the present invention can take and should therefore be taken as illustrative rather than limiting. It is only the claims, including all equivalents that are intended to define the scope of the invention.

I claim:

1. An electric motor monitor and control system, comprising:

a motor driver having an input and an output;

a motor driver input monitoring node coupled to the motor driver input;

a motor driver output monitoring node coupled to the motor driver output;

a fault compensator coupled to the motor driver input and to the motor driver input monitoring node;

a controller having a first input coupled to the motor driver input monitoring node and a second input coupled to the motor driver output monitoring node and a first output coupled to the motor driver input monitoring node and a second output coupled to the fault compensator, wherein the fault compensator changes an input signal received by the motor driver input when a fault is detected by the controller.

2. The electric motor monitor and control system of claim 1 wherein said control system is part of a motor vehicle.

3. The electric motor monitor and control system of claim 2 further comprising a motor electrically coupled to the motor driver and mechanically coupled to an adjustable vehicle pedal system of said motor vehicle.

4. The electric motor monitor and control system of claim 1 further comprising a servomotor electrically coupled to the motor driver and to the controller.

5. The electric motor monitor and control system of claim 1 further comprising a stepper motor electrically coupled to the motor driver and to the controller.

6. The electric motor monitor and control system of claim 1 wherein the motor driver is an H-bridge.

7. The electric motor monitor and control system of claim 1 wherein the motor driver is a pulse width modulated H-bridge.

8. The electric motor monitor and control system of claim 1 further comprising a second fault compensator coupled to a second motor driver input and third and fourth outputs of the controller.

9. The electric motor monitor and control system of claim 8 wherein the controller is configured such that the third and fourth outputs of the controller are configured to actuate a second output of the motor driver.

10. The electric motor monitor and control system of claim 9 further comprising a power source and a voltage regulator having an output, the power source being electrically coupled to the motor driver directly and the regulator output being directly coupled to the controller.

11. The electric motor monitor and control system of claim 10 wherein each fault compensator is a transistor having a base and a collector electrically biased by the separate outputs of the controller.

12. The electric motor monitor and control system of claim 11 wherein the input of the controller is electrically coupled to the collector of the transistor by a linear component.

13. The electric motor monitor and control system of claim 1 wherein one of the plurality of outputs of the controller is electrically coupled to the motor driver by only a linear component.

14. An electric motor monitor and control system for a motor vehicle adjustable pedal system for moving one or more vehicle control pedals of the vehicle, comprising:

a direct current motor mechanically coupled to the adjustable pedal system;

a motor driver having an input and an output, the motor driver being mechanically coupled with the motor and the adjustable pedal system;

an inverter electrically coupled with the motor driver input; and a controller having an input and a plurality of outputs electrically coupled to the inverter, the plurality of outputs being configured to actuate the output of the motor driver.

15. The electric motor monitor and control system of claim 14 further comprising a second inverter electrically coupled with a second motor driver input and a second plurality of outputs and a second input of the controller.

16. The electric motor monitor and control system of claim 15 wherein the second plurality of outputs of the controller are configured to actuate a second output of the motor driver.

17. The electric motor monitor and control system of claim 16 further comprising a power source and a voltage regulator having an output, the power source being electrically coupled to the motor driver directly and the output of the voltage regulator being directly coupled with the controller.

18. A method of controlling an adjustable pedal system of a motor vehicle, comprising:

actuating an inverter circuit electrically coupled to a plurality of outputs and an input of a motor controller;

driving an input of a driver to a logic state; and actuating a motor through the driver and the inverter circuit to adjust at least one of an accelerator and a brake pedal.

19. The method of claim 18 wherein the inverter circuit comprises a plurality of inverter circuits electrically coupled to the motor controller through the plurality of outputs and the input of the motor controller.

20. The method of claim 19 further comprising awakening from a sleep mode before actuating the inverter.

21. The method of claim 20 further comprising entering the sleep mode after actuating the motor.

* * * * *